United States Patent [19]

Sydansk

[11] Patent Number: 5,495,891
[45] Date of Patent: Mar. 5, 1996

[54] FOAMED GEL EMPLOYED AS A DRILLING FLUID, A LOST CIRCULATION FLUID, OR A COMBINED DRILLING/LOST CIRCULATION FLUID

[75] Inventor: Robert D. Sydansk, Littleton, Colo.

[73] Assignee: Marathon Oil Company, Findlay, Ohio

[21] Appl. No.: 336,150

[22] Filed: Nov. 8, 1994

[51] Int. Cl.$^6$ .......................... E21B 21/00; E21B 33/138
[52] U.S. Cl. .......................... 166/295; 166/309; 175/69; 175/72; 507/102; 507/120; 507/903
[58] Field of Search ..................... 507/102, 120, 507/903; 166/294, 295, 309; 175/69, 65, 72

[56] References Cited

U.S. PATENT DOCUMENTS

| | | | |
|---|---|---|---|
| 4,282,928 | 8/1981 | McDonald et al. | 166/274 |
| 4,453,596 | 6/1984 | Conway et al. | 166/278 |
| 4,532,052 | 7/1985 | Weaver et al. | 166/294 X |
| 4,643,255 | 2/1987 | Sandiford et al. | 175/72 X |
| 4,675,119 | 6/1987 | Farrar et al. . | |
| 4,683,949 | 8/1987 | Sydansk et al. | 166/270 |
| 4,726,906 | 2/1988 | Chen et al. . | |
| 4,740,319 | 4/1988 | Patel . | |
| 4,989,673 | 2/1991 | Sydansk | 166/250 |
| 5,105,884 | 4/1992 | Sydansk | 166/270 |
| 5,322,125 | 6/1994 | Sydansk | 166/295 |
| 5,439,057 | 8/1995 | Weaver et al. | 175/72 X |

FOREIGN PATENT DOCUMENTS

| | | |
|---|---|---|
| 0356242A2 | 2/1990 | European Pat. Off. . |
| 230044A1 | 12/1984 | Germany . |

OTHER PUBLICATIONS

Ennis, B. K., "Case History of Restimulations in Western Oklahoma", Production Operations Symp. Mar. 12–14, 1989. SPE 18861.

*Primary Examiner*—George A. Suchfield
*Attorney, Agent, or Firm*—Jack L. Hummel; Jack E. Ebel

[57] ABSTRACT

A process employing a foamed gel in a wellbore as a drilling fluid, lost circulation fluid, or combined drilling/lost circulation fluid during the wellbore drilling operation. The foamed gel is formed from a crosslinkable carboxylate-containing polymer, a crosslinking agent containing a reactive transition metal cation, a surfactant, an aqueous solvent, and an added gas.

24 Claims, No Drawings

FOAMED GEL EMPLOYED AS A DRILLING FLUID, A LOST CIRCULATION FLUID, OR A COMBINED DRILLING/LOST CIRCULATION FLUID

BACKGROUND OF THE INVENTION

1. Technical Field

The present invention relates to a process for drilling into a subterranean formation for the recovery of hydrocarbons, and more particularly to a drilling process wherein a foamed gel is employed as a drilling fluid, a lost circulation fluid, or a combined drilling/lost circulation fluid.

2. Description of Related Art

A drilling fluid is a specially designed fluid that is circulated through a wellbore as the wellbore is being drilled to facilitate the drilling operation. The circulation path of the drilling fluid typically extends from the surface wellhead down through the drill pipe string to the drilling face and back up through the annular space between the drill pipe string and wellbore face to the surface wellhead. The drilling fluid performs a number of functions as it circulates through the wellbore including cooling and lubricating the drill bit, removing drill cuttings from the wellbore, aiding in support of the drill pipe and drill bit, and providing a hydrostatic head to maintain the integrity of the wellbore walls and prevent well blowouts.

There are a number of well-known conventional drilling fluids including compositions termed "drilling muds". Drilling muds comprise high-density dispersions of fine solids in an aqueous liquid or a hydrocarbon liquid. An exemplary drilling mud is a dispersion of clay and/or gypsum in water. The solid component of such a dispersion is termed a "weighting agent" and is designed to enhance the functional performance of the drilling fluid. Other conventional drilling fluids include air, mists consisting of liquid particlulates dispersed within a gas medium, and conventional foams consisting of a gas contained within an aqueous liquid medium.

Although conventional drilling fluids perform satisfactorily in many subterranean applications, high-density drilling fluids such as drilling muds are generally unsuitable where the hydrostatic pressure gradient of the drilling fluid is greater than the fracture or parting pressure gradient of the rock surrounding the wellbore. Conventional drilling fluids may also be unsuitable in water-sensitive formations because of the risk of formation damage due to incompatibilities between the drilling fluid and the formation. Conventional drilling fluids may likewise perform unsatisfactorily in formations that are susceptible to lost circulation. Lost circulation is the migration of drilling fluid from the wellbore across the wellbore face into or out of the surrounding formations resulting in excessive loss of drilling fluid. Lost circulation is undesirable because it requires replacement of the lost drilling fluid, thereby adding a significant cost to the drilling operation. Lost circulation can also damage the hydrocarbon-producing zone or result in a well blowout with serious safety and environmental consequences.

In response to the problem of lost circulation, it is common to place a fluid in the wellbore containing additives termed "lost circulation materials" that specifically inhibit fluid communication between the wellbore and surrounding formations across the wellbore face. Lost circulation materials are frequently polymeric species as described in U.S. Pat. Nos. 4,740,319; 4,726,906; 4,675,119; and 4,282,928. A liquid medium having a lost circulation material dissolved or dispersed therein is termed a lost circulation fluid. Despite the general effectiveness of many conventional lost circulation fluids, certain subterranean conditions remain problematic for such fluids. In particular, conventional lost circulation fluids often do not effectively inhibit lost circulation in formations having relatively high permeability matrix or relatively high conductivity anomalies. Conventional lost circulation fluids may also be inapplicable in water-sensitive formations or formations susceptible to fracturing or parting.

Crosslinked polymer gels as taught by U.S. Pat. No. 4,989,673 have demonstrated performance advantages over the above-recited conventional drilling fluids and lost circulation fluids, because in many instances the gels effectively inhibit fluid loss in formations having high permeability matrix or high conductivity anomalies, while generally avoiding significant damage to water-sensitive formations. The relatively high chemical cost of crosslinked polymer gels, however, often limits their practical utility from an economic standpoint. Crosslinked polymer gels also have a relatively high hydrostatic pressure gradient in the wellbore that is undesirable for formations susceptible to fracturing or parting by conventional fluids of normal density.

Conventional foams have been employed as alternative drilling fluids or lost circulation fluids in formations susceptible to fracturing because such foams have a relatively low density and correspondingly low hydrostatic pressure gradient in the wellbore. Nevertheless, conventional foams have a number of shortcomings that limit their utility in wellbore drilling operations. Conventional foams often lack sufficient structure to effectively suspend and transport rock cuttings to the surface. In many cases, conventional foams also lack sufficient structure to adequately stop fluid loss, tending only to reduce the rate of fluid loss rather than stopping fluid loss altogether. Conventional foams also exhibit relatively high instability under certain formation conditions. For example, conventional foams tend to exhibit instability in the presence of crude oil. In addition, conventional foams often degrade when placed in formations having high downhole temperatures or in formations having brines exhibiting a high salt or hardness content.

Accordingly, it is an object of the present invention to provide a drilling fluid that performs effectively in conventional drilling operations. It is a particular object of the present invention to provide a drilling fluid that effectively suspends and transports rock cuttings to the surface during a drilling operation.

It is another object of the present invention to provide a lost circulation fluid that effectively prevents lost circulation in a wellbore under a broad range of subterranean conditions. It is yet another object of the present invention to provide a single fluid that performs as a combined drilling/lost circulation fluid. It is still another object of the present invention to provide a lost circulation material that can be added to a drilling fluid to form a combined drilling/lost circulation fluid that effectively prevents lost circulation of drilling fluid under a broad range of subterranean conditions. It is a particular object of the present invention to provide a lost circulation fluid or combined drilling/lost circulation fluid that effectively prevents lost circulation in a subterranean formation exhibiting relatively high permeability or high conductivity anomalies. It is yet another object of the present invention to provide a drilling fluid, lost circulation fluid or drilling/lost circulation fluid that effectively performs in a subterranean formation having a relatively low fracture or parting pressure gradient without substantially fracturing or parting the formation. It is still another object of the present invention to provide a drilling fluid, lost circulation fluid or drilling/lost circulation fluid that is relatively stable under harsh formation conditions including the presence of high temperatures, crude oil, high salinity brines or high hardness brines. It is further an object of the present invention to provide such a drilling fluid, lost circulation fluid or drilling/lost circulation fluid that is cost effective, having practical economic utility in the field.

SUMMARY OF THE INVENTION

The present invention is a process utilizing a specific foamed gel composition either as a drilling fluid, a lost circulation fluid or a combined drilling/lost circulation fluid. The foamed gel comprises a crosslinkable polymer, a crosslinking agent, an aqueous solvent, a surfactant, and an added gas. The crosslinkable polymer is a carboxylate-containing polymer having one or more carboxylate crosslinking sites. The crosslinking agent includes a reactive transition metal cation either in the presence of one or more inorganic and/or organic anions in a salt solution, or associated with one or more organic and/or inorganic ligands in a chemical complex.

Regardless of the form of the crosslinking agent, it functionally serves to crosslink the carboxylate-containing polymer, thereby imparting a high degree of structure or viscosity to the resulting crosslinked polymer network. At the same time, the surfactant uniformly disperses the added gas throughout the crosslinked polymer network to form the foamed gel without unduly diminishing the structure, viscosity or stability of the crosslinked polymer network. Consequently, the foamed gel displays fluid loss characteristics approaching those of equivalent gels at a substantially reduced chemical cost.

In accordance with the process of the present invention, a foamed gel having the above-described composition is prepared by premixing a gelation solution containing the foamed gel components exclusive of the added gas at the surface. The added gas is then dispersed within the gelation solution to form the foamed gel by one of several alternate sequences. In a first sequence, the added gas is combined with the gelation solution at the surface and the resulting composition, defined as a mature or immature foamed gel, is subsequently injected into the wellbore. In a second sequence, the added gas is coinjected into the wellbore with the gelation solution and the added gas and gelation solution are contacted in-line at the point of injection to form the foamed gel proximal to the wellhead. In a third sequence generally only applicable to lost circulation fluids, the added gas is coinjected into the wellbore with the gelation solution, but fluid isolation is maintained between the added gas and the gelation solution until they are in the wellbore at or near a point of lost circulation, thereby forming the foamed gel downhole.

Regardless of the particular sequence in which the foamed gel is formulated, the mature foamed gel resulting therefrom is employed in the wellbore in the conventional manner of a drilling fluid, a lost circulation fluid, or a combined drilling/lost circulation fluid during the wellbore drilling operation. In accordance with such teaching, the foamed gel can be placed in the wellbore by itself at the outset of the drilling operation as a single wellbore fluid to perform the function of a drilling fluid. Alternatively, the foamed gel can be placed in the wellbore by itself at the outset of the drilling operation as a single wellbore fluid to perform the combined function of a drilling/lost circulation fluid. In another alternative, the foamed gel can be placed in the wellbore following the loss of conventional drilling fluid to formations surrounding the wellbore during drilling operations. The foamed gel placed in the wellbore blocks fluid flow across the wellbore face, thereby performing the function of a lost circulation fluid.

In yet another alternative, the foamed gel can be added as a lost circulation material to a conventional drilling fluid. The resulting fluid composition inhibits fluid loss into and out of formations surrounding the wellbore during drilling operations while transporting cuttings from the drilling face to the surface. Accordingly, such a fluid performs the combined function of a drilling fluid and a lost circulation fluid and is correspondingly termed a combined drilling/lost circulation fluid.

By comparison with conventional foams, the present foamed gel is more effective in performing the drilling fluid functions of suspending and transporting rock cuttings to the surface during the drilling operation due to the enhanced structure or viscosity of the foamed gel. These characteristics also enable the foamed gel to more effectively perform the lost circulation fluid function of reducing fluid loss in subterranean formations, particularly in formations having relatively high permeability anomalies and a relatively high frequency of such anomalies. The foamed gel has specific utility in subterranean formations having a low fracture or parting pressure gradient insofar as the foamed gel effectively stops fluid loss without substantially fracturing or parting the formation as can occur with conventional water-based or oil-based drilling fluids. The foamed gel is relatively insensitive to varied surface conditions during its formulation and likewise to severe downhole conditions encountered during the drilling operation including exposure to high temperatures, crude oil, and high salinity or hardness brines. The process is usually practiced with conventional oilfield equipment and the foamed gel is relatively noncorrosive and nontoxic to the operator and the environment. Accordingly, the present process and foamed gel employed therein advantageously exhibit general utility to a broad range of drilling applications.

DESCRIPTION OF PREFERRED EMBODIMENTS

A number of specific terms are used throughout the specification to describe the process of the present invention and are defined as follows. A "formation" is a subterranean geological structure consisting essentially of "matrix", and in some instances, "anomalies". A "reservoir" hydrocarbon-bearing formation. An "anomaly" is a volume within a formation having a very high permeability relative to the matrix. The term "anomaly" is inclusive of such highly permeable volumes as fractures, fracture networks, joints, cracks, fissures, vugs, voids, solution channels, caverns, washouts, cavities, and the like. The "matrix" is generally characterized as substantially continuous, sedimentary geological material having a very low permeability relative to an anomaly. In addition, the matrix is often characterized as competent.

The term "wellbore" is defined as a bore hole extending or being extended from the earth surface to a reservoir. Thus, a wellbore is a conduit providing fluid communication between the surface and the formation penetrated thereby. The term "well" is synonymous with the term "wellbore". A "gel" or "gel medium" is a continuous three-dimensional chemically crosslinked polymeric network integrating a liquid into the interstices of the network. A "foamed gel" is a composition having a stabilized gas dispersion within a gel medium. The foamed gel structure is made up of gas bubbles separated from one another by lamellae of interfacially stabilized films of the gel medium. Other terms used herein have definitions in accordance with the conventional usage of a skilled artisan, unless otherwise defined hereafter.

The foamed gel utilized in the present invention comprises a crosslinkable polymer, a crosslinking agent, a liquid solvent, a surfactant, and an added gas. Although many crosslinkable polymers are known in the art, the crosslinkable polymers specifically applicable to the present invention are carboxylate-containing polymers. Preferred among the carboxylate-containing polymers are acrylamide-containing polymers. Of the acrylamide-containing polymers, the more preferred are polyacrylamide (PA), partially hydrolyzed polyacrylamide (PHPA), as well as copolymers, terpolymers and tetrapolymers of acrylamide. Exemplary copolymers include copolymers of acrylamide and acrylate, and copolymers, terpolymers or tetrapolymers containing AMPS or vinylpyrrolidone. PA, as defined herein, has from about 0% to about 3% of its amide groups hydrolyzed. Although 0% hydrolyzed PA initially lacks any carboxylate groups, it can undergo autohydrolysis under the conditions of the present process to generate carboxylate groups, thereby satisfying the definition of a carboxylate-containing polymer having utility within the scope of the present invention. PHPA has greater than about 3% of its amide groups hydrolyzed to carboxylate groups. The average molecular weight of an acrylamide polymer having utility herein is generally in a range between about 100,000 and about 30,000,000, and preferably between about 200,000 and about 25,000,000.

The crosslinking agent of the present invention effectuates chemical crosslinking between appropriate sites of the same or other polymer molecules, thereby creating the network structure of the gel medium. Crosslinking agents having utility herein are compositions containing a reactive transition metal cation. Such compositions include organic or inorganic salts of the reactive transition metal cation. Preferred salts are inorganic salts of a trivalent chromium cation such as chromic trichloride. Other such compositions having utility herein as crosslinking agents include water-soluble complexes containing the reactive transition metal cation associated with one or more organic carboxylate anions and/or one or more inorganic anions.

The term "organic carboxylate anion" as used herein encompasses carboxylate anionic species including mono-carboxylate anions, such as acetate, poly-carboxylate anions, such as malonate, and substituted derivatives of carboxylate anions, such as glycolate, lactate and citrate. The carboxylate anions are generally obtained from the corresponding acids or salts thereof. Preferred among such complexes are those including a trivalent chromium cation complexed with the carboxylate anion. An example of such a preferred complex is the trivalent chromium cation complexed with the acetate anion to form chromium triacetate as taught in U. S. Pat. No. 4,683,949 incorporated herein by reference. The chromium triacetate complex can be in the form of, or derived from, solid $CrAc_3$, solid $CrAc_3.H_2O$, solid $Cr_3Ac_7(OH)_2$ or a solution labeled "Chromic Acetate 50% Solution" that is commercially available, for example, from McGean Chemical Co., Inc., 1250 Terminal Tower, Cleveland, Ohio 44113, U.S.A.

The aqueous solvent of the gelation solution is substantially any aqueous liquid capable of forming a gelation solution from the solvent, crosslinkable polymer, crosslinking agent and surfactant. The term "solution" as used herein, in addition to true solutions, is intended to broadly encompass dispersions, emulsions, or any other homogeneous mixture of the gelation solution components in the aqueous solvent. The solvent is preferably a fresh water, although a brine, such as sea water or produced water from a subterranean formation can also have utility herein.

The surfactant may be substantially any conventional anionic, cationic or nonionic surfactant which is distributed throughout the gel medium to stabilize the interfaces between the solvent and gas. Anionic, cationic and nonionic surfactants are well known in general and are commercially available. Unlike conventional oilfield foams, the present foamed gel has been found to be relatively insensitive to the chemistry of the employed surfactants. Specific surfactants having utility in the present invention include ethoxylated sulfates, ethoxylated alcohols, petroleum sulfonates, and alpha olefin sulfonates.

The added gas may be substantially any gas that is substantially unreactive with the above-recited polymer, crosslinking agent, solvent and surfactant components and that is capable of being dispersed throughout the liquid medium. Examples of added gasses having utility herein are air, nitrogen, methane, carbon dioxide, nitrous oxide, natural gas, steam, produced gas or flue gas. Nitrogen, natural gas, or air are preferably used in the production of the present foamed gels.

The foamed gel is prepared by initially formulating a gelation solution at the surface that is a homogeneous fluid admixture of the solvent, polymer, crosslinking agent and surfactant. Surface admixing broadly encompasses batch mixing the components in bulk prior to injection into the wellbore or mixing the components in-line during injection into the wellbore. The polymer concentration of the gelation solution is generally at least about 500 ppm, preferably at least about 2,000 ppm, and most preferably within a range between about 3,000 ppm and about 100,000 ppm. The trivalent chromium cation concentration of the gelation solution is generally between about 10 ppm and about 20,000 ppm, and preferably between about 20 ppm and about 4,000 ppm. The crosslinking agent is present in amounts such that the molar ratio of the carboxylate anions of the crosslinking agent to the trivalent chromium cations of the gelation solution is preferably between about 0.5:1 and 100:1 and preferably between about 3:1 and 25:1. The surfactant concentration in the gelation solution is about 10 ppm to about 50,000 ppm, preferably about 100 ppm to about 10,000 ppm, and most preferably about 200 ppm to about 8,000 ppm. Typically, the gelation solution is prepared by mixing discrete aqueous solutions of the polymer, crosslinking agent, and surfactant.

Preparation of the foamed gel proceeds by combining the added gas with the aqueous gelation solution. The added gas can be combined with the gelation solution by conventional means such as sparging, high speed mixing, or simultaneously flowing the gas and gel composition-through one or more orifices, such as a screen or a plate with one or more orifices, or through a solid packing, such as a sandpack or a gravel pack. The location and timing of the gas addition step can be any one of several alternatives, including at the surface prior to injection of the foamed gel into the wellbore or at the surface simultaneous with coinjection of the gelation solution into the wellbore.

The volumetric gas content of the foamed gel, termed foam quality, is expressed as the volume percent of gas in the foamed gel. Foamed gels having utility in the present process generally have a foam quality between about 20% and about 99%, preferably between about 50% and about 98%, and most preferably between about 60% and about 97%. The foam quality of the foamed gel is selected within the limits set forth above as a function of the specific application of the foamed gel. Foamed gel strength is usually an inverse function of foam quality. Thus, if a high strength foamed gel is desired, the foamed gel is formulated with a relatively low foam quality. Conversely, if a lower strength, less costly, or lower density foamed gel is desired, the foamed gel is formulated with a higher foam quality. It is noted that high strength foamed gels have specific application as lost circulation fluids in formations exhibiting high permeability matrix or relatively large anomalies where the foamed gel is subjected to high pressure drops at or near the wellbore face.

Maturation of the foamed gel requires crosslinking of the polymer and crosslinking agent within the gelation solution. For acrylamide polymers containing carboxylate groups, crosslinking, or gelation as it is alternatively termed, is normally initiated as soon as the polymer and crosslinking agent contact unless an optional delaying agent is included in the gelation solution. If a delaying agent is present, crosslinking is not initiated until after activation of the crosslinking agent. Delaying agents that may have utility in the gelation solution of the present invention are water-soluble acids and salts of carboxylate anions. The carboxylate anion of the acid or salt can be the same species as the carboxylate anion of the crosslinking agent or can be a different species. Preferred delaying agents in the practice of the present invention are salts or acids of acetate, lactate, malonate, citrate, and glycolate. Among the preferred delaying agents are acetate salts, such as ammonium acetate, potassium acetate, or sodium acetate. Of the preferred delaying agents, malonate and citrate have the highest degree of ligand strength and acetate the lowest with glycolate and lactate being of intermediate strength, wherein the delay time is normally a direct function of the ligand strength of the delaying agent.

For unhydrolyzed PA, crosslinking does not normally occur until the PA has undergone a significant degree of hydrolysis. Thus, in the absence of a delaying agent, crosslinking of the unhydrolyzed PA is a function of the polymer hydrolysis reaction. If a delaying agent is present, however, PA crosslinking can be a function of both the polymer hydrolysis reaction and the ligand strength of the delaying agent. Where the delaying agent is a carboxylate ligand, PA crosslinking is also a function of the molar ratio of the carboxylate anion to chromium cation for a given carboxylate anion. In particular, the length of the delay time for the PA crosslinking reaction increases as the molar ratio of carboxylate to chromium ions increases.

Before crosslinking is completed, the foamed gel is characterized as being immature. Once crosslinking has gone to completion, i.e., when either substantially all of the crosslinking agent or substantially all of the carboxylate crosslinking sites is consumed, the foamed gel is characterized as being mature. The integral components of the resulting mature foamed gel are the gel medium and the added gas dispersed therein. The crosslinked polymer makes up the structural network of the gel medium and the liquid solvent makes up the interstitial liquid of the medium.

The physical properties of the foamed gel are a function of the specific foamed gel components and their relative proportions. Values of the above-recited variables are selected to create foamed gels across a wide range of viscosities, structures, stabilities, and densities as desired. The viscosity of foamed gels can range from highly viscous to viscosities approaching that of water. It is primarily the character of the gel medium that contributes to the structure or viscosity and stability of the foamed gel. In general, the degree of structure or viscosity and stability of a foamed gel containing an acrylamide polymer is increased by increasing the polymer concentration of the liquid phase. However, an oftentimes more cost-effective and preferred means for achieving the same effect is to employ a higher molecular weight polymer or, alternatively, a polymer having a higher degree of hydrolysis at a relatively fixed concentration. Conversely, a reduction in the degree of structure or viscosity is achieved by using a lower molecular weight polymer or, alternatively, one having a lower degree of hydrolysis. Thus, the skilled practitioner can design the foamed gel in correspondence with the fracturing or parting pressure gradient and the permeability of the formation through which the wellbore is being drilled and/or the required solids carrying capacity of the drilling fluid, thereby ensuring the effective performance of the foamed gel as a drilling fluid, lost circulation fluid, or combined drilling/lost circulation fluid.

Relative to conventional oilfield foams, the present foamed gel is significantly more stable over a wide range of temperatures, pressures, and formation water salinities and hardness. The foamed gel is also highly stable in the presence of liquid hydrocarbons such as crude oil, resisting collapse and fluid drainage. It has further been found that foamed gels, having drilling fluid or lost circulation fluid performance characteristics similar to those of corresponding conventional gels absent an added gas, can be formed despite the presence of the added gas in the foamed gels. Thus, it is apparent that, like conventional gels, the present foamed gels can be tailored to meet the specific performance requirements of a given drilling operation, but at a substantially reduced chemical cost. The foamed gels also have a substantially lower density than conventional gels, rendering the foamed gels advantageous in formations having a relatively low fracture or parting pressure gradient. A relatively low fracture or parting pressure gradient is typically a pressure gradient below about 9.7 kPa/m.

In the practice of the present invention, the foamed gel is designed in accordance with its particularly desired function, the nature of the drilling operation and the characteristics of the formations through which the wellbore is being drilled. Thus, when a lost circulation fluid function is desired, the foamed gel is designed with a sufficient structure to substantially eliminate lost circulation across the wellbore face when an appropriate amount of the foamed gel is employed. When a drilling fluid function is desired, the foamed gel is designed with a sufficient structure to effectively suspend and transport rock cuttings to the surface during the drilling operation. Likewise, when a high permeability matrix, a high frequency of anomalies, or disproportionately large anomalies are encountered in formations through which the wellbore is being drilled, the foamed gel is designed having a relatively high strength. If the formations encountered are easily fractured or parted, have a relatively low permeability matrix, or are essentially free of anomalies in direct communication with the wellbore, the foamed gel is designed having a relatively low strength. Foamed gels satisfying these criteria typically have a dynamic oscillatory viscosity at 1 radian per second between about $5\times10^1$ and about $1\times10^8$ cp, and preferably between about $5\times10^3$ and about $4\times10^6$ cp.

It is believed that the foamed gel functions as a lost circulation fluid by forming a filter cake at the wellbore face that prevents the flow of fluids across the face. As used herein, the term "wellbore face" includes the face of the drilled out bore hole and the faces of any anomalies in direct communication with the bore hole. Since a properly designed foamed gel functioning as a drilling fluid, lost circulation fluid, or combined drilling/lost circulation fluid does not normally exhibit significant penetration of the formation matrix beyond the wellbore face, substantially all of the permeability reduction in the formation attributable to the foamed gel usually occurs immediately adjacent to wellbore face, i.e., within about 1 centimeter thereof. Consequently, the present foamed gels are essentially nondamaging to the formation and do not substantially inhibit the subsequent recovery of hydrocarbon fluids from the formation across the wellbore face. If it is nevertheless desired to remove residual foamed gel from the wellbore following the drilling operation, the foamed gel is fully reversible by conventional gel breakers, such as peroxides, hypochlorites, or persulfates. Alternatively, residual foamed gel can be removed from the wellbore with a high-pressure water washing tool.

Placement and circulation of the foamed gel in a wellbore as a drilling fluid, lost circulation fluid or combined drilling/lost circulation fluid is performed in accordance with a number of different embodiments. In one embodiment, the foamed gel is placed in the wellbore at the outset of a conventional drilling operation and is continuously circulated through the wellbore during the drilling operation, functioning as a drilling fluid. In another embodiment, the foamed gel is a lost circulation material added to a conventional drilling fluid. The resulting composition is placed in the wellbore, functioning as a combined drilling/lost circulation fluid. In yet another embodiment, the foamed gel is placed in the wellbore by itself to function as a combined drilling/lost circulation fluid. In still another embodiment, the foamed gel can be placed in the wellbore following placement of the drilling fluid to function as a lost circulation fluid. As such, the foamed gel can have a remedial function, being substituted for the conventional drilling fluid in its entirety, if lost circulation is detected or encountered during the drilling operation. Alternatively, the foamed gel can supplement the conventional drilling fluid that is permitted to remain in the wellbore when lost circulation is detected.

The following examples demonstrate the practice and utility of the present invention, but are not to be construed as limiting the scope thereof.

EXAMPLE 1

A flooding experiment is performed at ambient temperature in a 122 cm long sandpack having a permeability of 130,000 md. The sandpack is at residual saturation with crude oil and a synthetic oilfield brine having significant hardness and sulfate concentrations. A gelation solution is prepared containing the above-described synthetic brine, 9,000 ppm PA, 170 ppm trivalent chromium ion complexed within a chromic acetate complex, and 3,000 ppm $C_{14-16}$ alpha olefin sulfonate surfactant. The PA is 2.1 mole % hydrolyzed and has a molecular weight of 11,000,000. The gelation solution is injected into the sandpack prior to any substantial gelation thereof and the apparent insitu viscosity of the gelation solution is measured as 240 cp. Thereafter, the substantially ungelled gelation solution and nitrogen gas are coinjected into the 130,000 md sandpack and the apparent insitu viscosity of the coinjected composition is measured as 220 cp. A fine-textured foam is produced from the sandpack having a foam quality of 88% at atmospheric pressure.

The bulk of the injected composition is allowed to age to a mature crosslinked foamed gel in the sandpack. Thereafter, the sandpack is flooded with the synthetic brine for 120 hours while maintaining the differential pressure at 172 kPa. After 120 hours the permeability reduction ($k_f/k_i$) of the sandpack to the synthetic brine is measured to be $8\times10^{-7}$, wherein the final permeability, $k_f$, is 0.1 md. Upon completion of the synthetic brine flood, the sandpack is flooded with nitrogen gas by applying a 345 kPa differential pressure across the sandpack. No throughput of any fluids, including gas, is observed during this stage of gas flooding. The results of Example 1 show that the above-described foamed gel does not exhibit significant migration through the sandpack under a relatively high differential pressure. Thus, it can be inferred that the instant foamed gel would not significantly penetrate a wellbore face into normal permeability matrix during a drilling operation, thereby showing the instant foamed gel to be an effective lost circulation fluid capable of face plugging permeable matrix and preventing fluid flow therethrough.

EXAMPLE 2

A flooding experiment is performed at ambient temperature in a 30.5 cm long sandpack having a permeability of 126,000 md. The sandpack is at residual saturation with a crude oil and a synthetic oilfield brine having different compositions than those of Example 1. A gelation solution is prepared containing the synthetic brine, 7,000 ppm PA, 160 ppm trivalent chromium ion complexed within a chromic acetate complex, and 2,000 ppm $C_{14-16}$ alpha olefin sulfonate surfactant. The PA is 1.9 mole % hydrolyzed and has a molecular weight of 11,000,000. The gelation solution is injected into the sandpack prior to any substantial gelation thereof and the apparent insitu viscosity of the gelation solution is measured as 230 cp. Thereafter, the substantially ungelled gelation solution and nitrogen gas are coinjected into the 126,000 md sandpack and the apparent insitu viscosity of the coinjected composition is measured as 140 cp. A fine-textured foam is produced from the sandpack having a foam quality of 82% at atmospheric pressure.

The coinjected composition is allowed to age to a mature crosslinked foamed gel in the sandpack. Thereafter, the sandpack is flooded with the synthetic brine for 145 hours at a differential pressure of 345 kPa. After 145 hours, the permeability reduction ($k_f/k_i$) of the sandpack to the synthetic brine is measured to be $6\times10^{-7}$, wherein $K_f$ is 0.08 md. The results of Example 2 reaffirm that the above-described foamed gel can perform as an effective lost circulation fluid capable of face plugging permeable matrix and preventing fluid flow therethrough.

EXAMPLE 3

A wildcat well is drilled from the earthen surface to a target reservoir that is a fractured carbonate formation at 1890 meters true vertical depth having a reservoir temperature of 70° C. The carbonate formation has a gross thickness of about 10.7 meters and is generally susceptible to fracturing, formation damage and lost circulation when drilled with conventional drilling muds. Accordingly, the wildcat well is drilled with a conventional drilling mud to within about 7.6 meters from the top of the targeted formation at which point the drilling fluid is switched from the conventional drilling mud to the foamed gel of the present invention.

The foamed gel is prepared from a gelation solution containing a local surface water, 9,000 ppm PHPA, 68 ppm trivalent chromium ion complexed within a chromic acetate complex (corresponding to 300 ppm $CrAc_3$), 2,300 ppm $C_{14-16}$ alpha olefin sulfonate surfactant, a biocide and small amounts of several other drilling fluid additives. The PHPA is 30 mole % hydrolyzed and has a molecular weight of nominally 7,000,000. Nitrogen is added to the gelation solution and the PHPA therein is lightly crosslinked with the $CrAc_3$, wherein the weight ratio of PHPA to $CrAc_3$ is 30:1, producing the foamed gel designed with an average foam quality within the wellbore of 77%. The well is successfully drilled through the targeted carbonate formation employing the foamed gel as a combined drilling/lost circulation fluid. The newly-drilled well is completed and placed in production at a satisfactory oil production rate. No significant lost circulation, fracturing or formation damage problems are encountered during or after the drilling operation.

A second well is drilled in the same field using a conventional drilling mud throughout the entire drilling operation as a combined drilling/lost circulation fluid. The oil production rate of the second well is unsatisfactory relative to the first well.

While the foregoing preferred embodiments of the invention have been described and shown, it is understood that alternatives and modifications, such as those suggested and others, may be made thereto and fall within the scope of the present invention.

I claim:

1. A process for drilling a wellbore from a wellhead at the surface into a subterranean formation for production of hydrocarbons, the process comprising:
    placing a foamed gel in a wellbore being drilled, wherein said foamed gel comprises a crosslinkable carboxylate-containing polymer, a crosslinking agent containing a reactive transition metal cation, a surfactant, an aqueous solvent, and an added gas; and
    substantially plugging a wellbore face of said wellbore with said foamed gel to prevent significant lost circulation of fluid from said wellbore across said wellbore face into a surrounding formation.

2. The process of claim 1 wherein said foamed gel is prepared by mixing said polymer, crosslinking agent, surfactant and solvent to form a gelation solution, contacting said gelation solution with said added gas, and substantially crosslinking said polymer with said crosslinking agent.

3. The process of claim 2 wherein said gelation solution and added gas are contacted at the surface and thereafter injected into said wellbore.

4. The process of claim 2 wherein said gelation solution and added gas are contacted at the surface by coinjection into said wellbore.

5. The process of claim 2 wherein said gelation solution and added gas are contacted in said wellbore.

6. The process of claim 1 wherein said carboxylate-containing polymer is an acrylamide-containing polymer.

7. The process of claim 6 wherein said acrylamide-containing polymer is selected from a group consisting of polyacrylamide, partially hydrolyzed polyacrylamide, and copolymers, terpolymers and tetrapolymers of acrylamide.

8. The process of claim 1 wherein said reactive transition metal cation is trivalent chromium.

9. The process of claim 1 wherein said surfactant is selected from a group consisting of ethoxylated sulfates, ethoxylated alcohols, petroleum sulfonates, and alpha olefin sulfonates.

10. The process of claim 1 wherein said crosslinking agent is an organic salt of trivalent chromium.

11. The process of claim 1 wherein said crosslinking agent is a complex including trivalent chromium and one or more anionic carboxylate ligands.

12. The process of claim 11 wherein said one or more anionic carboxylate ligands is acetate.

13. The process of claim i wherein said foamed gel has a hydrostatic pressure gradient in said wellbore less than the fracture or parting pressure gradient of said formation.

14. A process for drilling a wellbore from a wellhead at the surface into a subterranean formation for production of hydrocarbons, the process comprising:
    mixing a foamed gel and a substantially gel-free drilling fluid to form a combined drilling/lost circulation fluid, wherein said foamed gel comprises a crosslinkable carboxylate-containing polymer, a crosslinking agent containing a reactive transition metal cation, a surfactant, an aqueous solvent, and an added gas;
    placing said drilling/lost circulation fluid in a wellbore being drilled; and
    circulating said drilling/lost circulation fluid through said wellbore to transport rock cuttings to the surface while substantially plugging a wellbore face of said wellbore with said drilling/lost circulation fluid to inhibit lost circulation of fluid from said wellbore across said wellbore face into a formation surrounding said wellbore.

15. The process of claim 14 wherein said carboxylate-containing polymer is an acrylamide-containing polymer.

16. The process of claim 14 wherein said reactive transition metal cation is trivalent chromium.

17. The process of claim 14 wherein said crosslinking agent is an organic salt of trivalent chromium.

18. The process of claim 14 wherein said crosslinking agent is a complex including trivalent chromium and one or more anionic carboxylate ligands.

19. A process for drilling a wellbore from a wellhead at the surface into a subterranean formation for production of hydrocarbons, the process comprising:
    placing a foamed gel in a wellbore being drilled, wherein said foamed gel comprises a crosslinkable carboxylate-containing polymer, a crosslinking agent containing a reactive transition metal cation, a surfactant, an aqueous solvent, and an added gas; and
    circulating said foamed gel through said wellbore to transport rock cuttings to the surface.

20. The process of claim 19 wherein said carboxylate-containing polymer is an acrylamide-containing polymer.

21. The process of claim 19 wherein said reactive transition metal cation is trivalent chromium.

22. A process for drilling a wellbore from a wellhead at the surface into a subterranean formation for production of hydrocarbons, the process comprising:
    placing a foamed gel in a wellbore being drilled, wherein said foamed gel comprises a crosslinkable carboxylate-containing polymer, a crosslinking agent containing a reactive transition metal cation, a surfactant, an aqueous solvent, and an added gas; and
    circulating said foamed gel through said wellbore to transport rock cuttings to the surface while substantially plugging a wellbore face of said wellbore with said foamed gel to inhibit lost circulation of fluid from said wellbore across said wellbore face into a formation surrounding said wellbore.

23. The process of claim 22 wherein said carboxylate-containing polymer is an acrylamide-containing polymer.

24. The process of claim 22 wherein said reactive transition metal cation is trivalent chromium.

* * * * *